United States Patent [19]
Hendrickson et al.

[11] 3,809,172
[45] May 7, 1974

[54] SHOCK ABSORBER MOUNTING FOR SNOWMOBILES

[76] Inventors: G. Vernon Hendrickson, 309 Main Ave. So., Rouseau, Minn. 56751; Kermit A. Hendrickson, Rt. 2, Lake Park, Minn. 56554

[22] Filed: Aug. 17, 1972

[21] Appl. No.: 281,448

[52] U.S. Cl.................... 180/5 R, 280/25, 280/26, 287/85 A, 267/32
[51] Int. Cl.................... B62b 13/12, B62m 27/02
[58] Field of Search........................ 180/5 R, 3, 4, 6; 287/85 A, 85 R; 280/21, 26, 25, 8–14

[56] References Cited
UNITED STATES PATENTS

| | | | |
|---|---|---|---|
| 3,724,578 | 4/1973 | Erickson | 180/5 R |
| 1,872,259 | 8/1932 | Eldridge | 287/85 AR |
| 3,705,749 | 12/1972 | Harvey | 180/5 R |

*Primary Examiner*—Richard J. Johnson
*Attorney, Agent, or Firm*—James R. Cwayna

[57] ABSTRACT

A structure for mounting shock absorbers onto snowmobiles or other vehicles that are provided with front steering and riding ski structures including means for mounting one end of the shock absorber to the spindle housing of the snowmobile with the other end thereof being provided in absorbing relationship to the ski of the vehicle and providing a means for mounting the upper end of the shock absorber in a universal captured arrangement which will permit the shock absorber to react in its normal fashion for any ski position and further such mounting means providing an adjustable universal arrangemement wherein the tension applied to the upper end of the shock absorber will tend to return the skis to a forward or frontwardly directed alignment.

3 Claims, 4 Drawing Figures

PATENTED MAY 7 1974　　　　　　　　　　　　　　3,809,172

SHOCK ABSORBER MOUNTING FOR SNOWMOBILES

The snowmobile art has progressed rapidly in the past several years and many riding comfort arrangements have been provided thereon. One of these improvements has been the inclusion of shock absorbers between the skis of the snowmobile and the spindles by which the skis are controlled and turned. The utilization of shock absorbers between the skis and the spindles upon which the skis are mounted provides a certain degree of shock absorbing and thus improved riding capabilities but such an arrangement results in several difficulties. When providing a shock absorber between a ski and a spindle upon which a ski is mounted, the spindle is required to absorb a portion of the transferred shock and as such, a great degree of bending force is applied to the spindle.

Applicant has provided herein a shock absorber mounting arrangement wherein the upper connective element of the shock absorber is attached to the bearing post or housing for the spindle such that the spindle does not absorb any of the transferred shock and further applicant provides a means for mounting the upper end of the shock absorber such that a universal movement factor is allowed thereby such that the lower portion of the shock absorber attached to the ski may be shifted through a plurality of directions without placing undue torque or lever forces upon the attachment bracket. The universal mounting will tend to bring the shock absorber and thus the attached ski to a forward direction thereby assisting the driver to return the steering gear to its frontal drive position.

With applicant's universal mounting and adjustability features provided therein, the degree of universal movement is controlled and the mounting further provides for the absorbing ability to be available no matter to what direction the ski is turned.

It is therefore an object of applicants' invention to provide a mounting for a shock absorbing member to be placed on snowmobiles and the like wherein a first portion thereof is attached to the ski of the snowmobile and a second portion thereof is universally mounted such that the shock absorbing ability of the shock absorber is available in any turning disposition of the ski.

It is a further object of applicants' invention to provide a universal mounting for one end of shock absorber of a snowmobile or the like with the other end of the shock absorber being attached to the ski thereof such that the universal adjustment at the one mentioned end thereof may be loaded to a desired degree which will assist in returning the skis of the snowmobile to a forwardly directed position upon completion of any turn or the like.

It is still a further object of applicants' invention to provide a shock absorber mounting for snowmobiles and the like which may be attached to the snowmobiles which are now not provided with such a shock absorbing system by simply providing a bracket member mountable on the spindle housing and bearing portion of the snowmobile without requiring that any modifications or the like be made to the spindle or ski turning portions of a snowmobile.

These and other objects and advantages of applicants' invention will more fully appear from the accompanying description made in connection with the accompanying drawings wherein like numerals are utilized for the same or similar parts throughout the accompanying views and in which.

Figure 1:
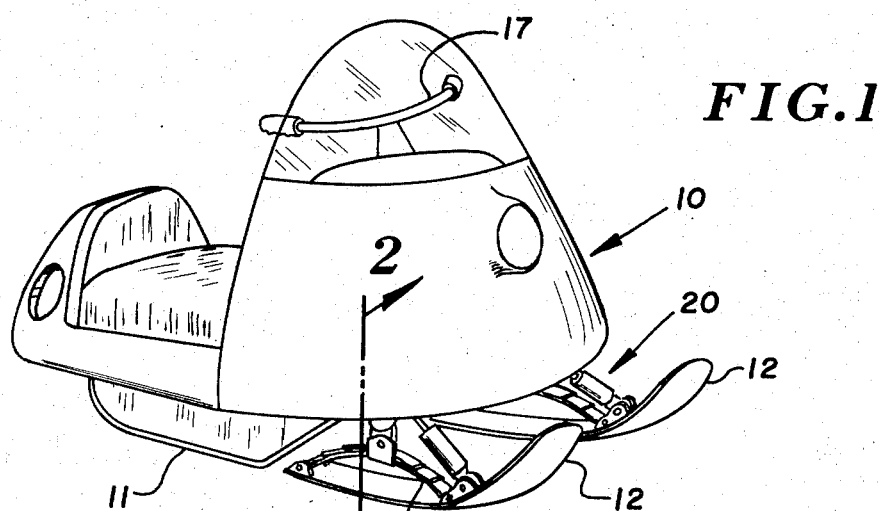
FIG. 1 is a prespective frontal view of a snowmobile provided with shock absorbers on the steering ski portions thereof.

In accordance with the accompanying drawings, a snowmobile generally designated 10 is illustrated in FIG. 1 and to those skilled in the art it is well known that snowmobiles mormally provide a track 11 for driving of the vehicle and provide at least one directing and steering ski and in the case illustrated, a pair of such skis 12 are provided. It is not without this scope of applicants' invention that this shock absorber system could be applied to either a unitary or dual ski snowmobile and therefore no differentiation is made in this application between a snowmobile which will utilize either a single or a dual ski.

Figure 2:
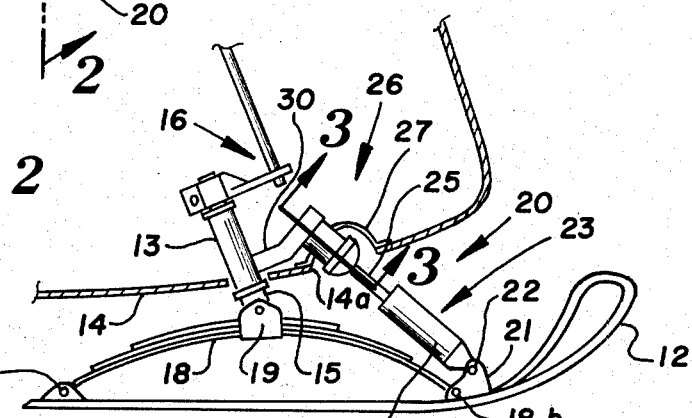
FIG. 2 is a side elevation taken substantially along Lines 2—2 of FIG. 1 illustrating the connection of the shock absorber to the spindle housing and ski of the snowmobile.

Normally the ski of a snowmobile is mounted as is illustrated in the cross sectional arrangement of FIG. 2 of applicants' illustrations. In the form shown a spindle mounting or bearing member 13 is provided which spindle mounting member 13 extends through the body 14 of the snowmobile and which spindle mounting member 13 is normally attached in some manner to the frame of the snowmobile. These are structural considerations which are well known to those skilled in the art and explanations as to mounting points and linkage for this spindle with respect to the frame and the body is thought to be irrelevant to the objects of this invention. Obviously in any snowmobile design, whether a uni or dual ski configuration a steering spindle 15 must be provided to extend through the spindle housing 13 and thus to the body of the unit and this spindle 13 is controlled through a steering mechanism and links generally designated 16 which in turn are connected to the steering handle bar mechanisms 17 of the snowmobile for controlled movement of the skis 12.

In the standard and well known configurations for such steering skis, the ski 12 is provided with a leaf spring mounting 18 having a rearward mounting member 18a and a frontal mounting member 18b upon the ski 12 with a connective U-channel 19 or the like which will connect a midpoint portion of the leaf spring 18 to the bottom of the spindle member 15 such that as the spindle is rotated this rotative directional steering will be transmitted to the ski 12 while the ski is permitted to, through the U-shaped mounting 19, move in a plane normal to the mounting thereof to the spindle.

In the form shown, applicant provides a shock absorber mounting designated in its entirity 20 at the forward end of the ski such that the attachment bracket 18b may be extended as at 21 to provide a second pin mounting 22 for the lower end of the shock absorber designated 23. The shock absorber as illustrated consists of a cylinder portion 24 with a rod member 25 extending therefrom. Obviously the action of a shock absorber is known in the art and no discussion of its interior structure is deemed necessary.

Applicants' basic concept in this invention lies in the means for attaching the shock absorber 23 to the spindle housing 13 of the snowmobile and this mounting is generally designated 26. In the form shown an aperture 14a is provided through the body 14 of the snowmobile and a weather seal such as a rubber cap member 27 is provided to seal against the body 14 around the aperture 14a formed therethrough and extend upwardly and around the attachment portion 26 of the shock absorber 23. Attachment bracket 26 as illustrated, is arranged interiorly of the housing but it should be obvious that this same bracket arrangement depending upon the length and location of the spindle housing 13 could well be without the body 14 of the snowmobile and therefore this weather seal arrangement would not be necessary for proper operation of the unit. This placement depends upon the particular snowmobile involved and is not a necessary feature of the invention.

As illustrated in the accompanying drawings, a first bracket member 30 is porvided and is secured to the spindle housing 13 and this bracket in the form shown includes an extending leg member having means for positioning the upper end or rod portion 25 of the absorber 23 in a relationship with the ski 12 such that in the normal frontal driving position a maximum shock absorbing ability will be achieved.

A particular form of mounting is illustrated in FIG. 3 wherein again the rod of the shock absorber 23 is designated 25 and means are provided for universally attaching this end of the rod 25 to the extending and mounting bracket 30.

In the form shown a first cup member 31 cylindrical in shape and having threads 32 at the extending end thereof is provided with means such as a cap screw 33 arranged on the closed end thereof to hold the housing member 31 securely to the extending leg 30 of the attachment bracket. This cylindrical cup member 31 provides interiorly thereof a first cushioning or resilient member 34 extending a predetermined distance longitudinally therein. As illustrated herein the end 25a of the rod member 25 of the cylinder 23 is threaded and a washer 35 or the like is captured thereon with a pair of threaded capturing elements 36a, 36b on either side thereof. This washer or stop element 35 abuts against the end 34a of the resilient biasing member 34.

Arranged opposite the washer or stop member 35 is a second resilient member 37 having a convex shape which abuts with the stop or washer element 35 and this member is again a compressable and resilient member which will permit movement of the attachment rod 25 and washer 35 between the resilient member 34 and itself.

A first bearing member 38 is arranged on one side of the resilient member 37 and this washer element 38 is of a material having a coefficient of friction such as brass or the like. It should be noted that this member is substantially dome shaped and provides an aperture 38 therethrough to permit the rod 25 to pass therethrough and this member is of a size to permit certain shifting therearound about the convex resilient member 37.

Figures 3, 4:
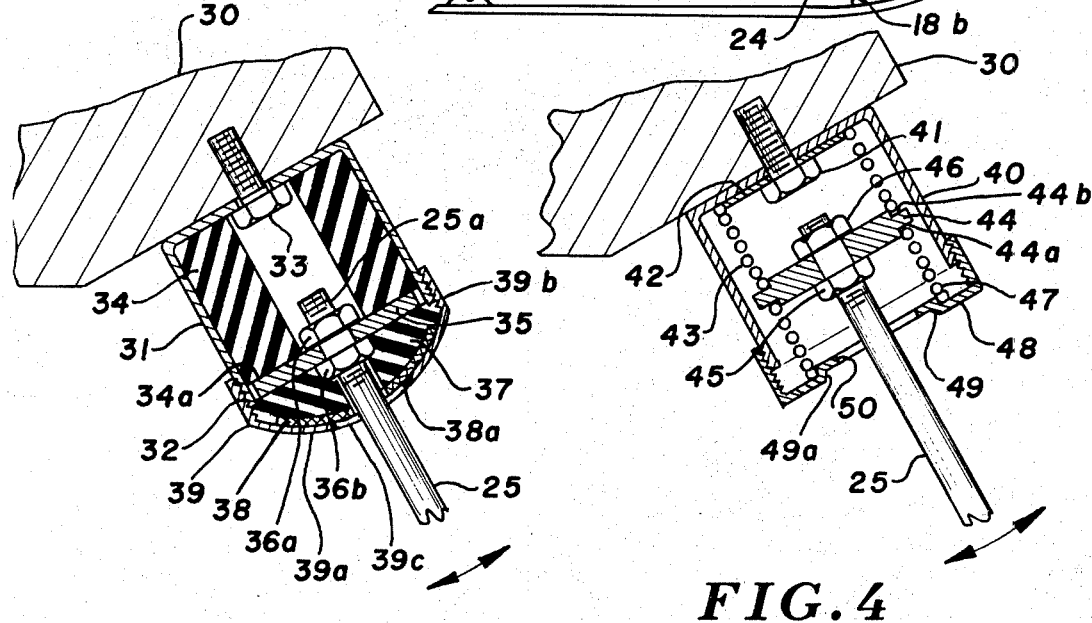
FIG. 3 is a section taken substantially along Line 3—3 of FIG. 2.
FIG. 4 is a view similar to FIG. 3 illustrating a second modified form of the invention.

Capturing this entire configuration is a cap assembly or capturing element 39 having a dome shaped portion 39a and a cylindrical threaded portion 39b extending therefrom with a passage 39c therethrough of a size to permit a relatively great degree of oscillation and shifting of the rod 25 therein. With the configuration as illustrated in FIG. 3 it should be obvious that the capturing element 39 may be adjusted against the resilient member 37 and thus force the washer stop member 35 of rod 25 against resilient member 34 to control the deviations from an in line relationship of the rod 25 of the cylinder 20. With this system then a certain spring biasing, universal mounting of the shock absorber 23 is provided wherein the rod 25 of the shock absorber 23 is permitted to move in any direction with a certain degree of latitude and by tightening of the capturing element 39 an increased tensioning will result and therefore the tendency of the rod to return to forward is controlled. This will assist the operator in bringing the ski to a forward position.

In the modified form of the invention as illustrated in FIG. 4 the same cylindrical cup member 40 is provided having a capturing element 41 extending upwardly into the supporting bracket 30 provided to encapture this cylindrical cup member 41 and in the form shown a first guide member 42 is provided about the capturing element for the centering of a biasing member 43. This biasing member 43 extends longitudinally in the cup member 40 to engage against one side of a washer or stop member 44 which stop member again is attached to the shock absorber rod member 25 which stop member 44 is held thereon through a pair of capturing elements 45, 46 and wherein the washer stop member 44 is provided with shoulder sections 44a, 44b for centering of the first biasing member 43 and a second biasing member 47 arranged on the opposite side of the stop shoulder to bias against the first mentioned spring 43. In the form shown, a capturing cap 48 is provided with a first shoulder 49 with a guide shoulder 49a interiorly thereof with an aperture 50 through and interiorly of the shoulder member 49a such that the biasing member 47 will be arranged between the shoulder member 49a and the shoulder 44a of the stop element 44. In this form, the capturing cap 48 is adjustably arranged upon the cylinder 40 such that tightening thereof will increase biasing on both sides of the stop element 44 and thus increase its tendency to return to a normal position therefore tending to bring the shaft 25 of the shock absorber 23 into a frontal straight line position with regard to the bracket 30.

In the second form of the invention two biasing members designated 43 and 47 are provided but it should be obvious that either one of these members, preferably the interior member 43 could be replaced through a flexible biasing member such as the member 34 as illustrated in FIG. 3. This would not depart from the scope of the invention as the concept is to provide biasing between these members which will permit universal movement of the shaft 25 of the shock absorber 23 and still tend to return the absorber and the attached ski to a frontal position.

With the universal arrangement provided in this unit it should be obvious that although the ski may be turned that the shock absorbing qualities of the absorber 23 will still be maintained without producing undue flexing of the attachment rod 25. In addition to this advantage it should be obvious that since the upper end of the rod 25 of the shock absorber 23 is fixedly attached to the spindle housing portion 13 that the degree of compression will determine the degree of driver realignment to bring the ski into a frontal direction for straight line steering.

It should be obvious that applicant has provided a unique mounting arrangement for a shock absorber for snowmobiles and the like which will permit its utilization not only as a new attachment to snowmobiles but as an additional attachment to snowmobiles which are not now provided with such devices.

What I claim is:

1. An improvement in mounting shock absorbing devices to vehicles having ski members or the like for turning, such improvement including:
   a. a shock absorber having a first and a second end, one of such ends being attached to a ski of the vehicle;
   b. a bracket securely arranged on a selected portion of the snowmobile;
   c. a mounting member provided on said bracket to capture said other end of said absorber, having:
      1. a first cup shaped member attached to said bracket and having connector means on one open, extending end;
      2. a first resilient member received in said cup shaped member;
      3. a closure member receivable on said connector means and having an aperture for receiving the rod of the absorber therethrough;
      4. a second resilient member received in said closure member; and,
      5. stop means on the rod of said absorber arranged between said first and second resilient member.

2. The structure set forth in claim 1 and said closure member being adjustably mounted on said connector member.

3. The structure set forth in claim 1 and said closure member being arranged and constructed to control said resilient members and thereby control the tension on said rod means.

* * * * *